May 23, 1939.  E. A. BIERWIRTH ET AL  2,159,880

METHOD OF MAKING A VEHICLE WHEEL

Filed Oct. 16, 1936  3 Sheets-Sheet 1

INVENTORS
EDWIN A. BIERWIRTH
HERMAN J. KIENLE
BY
ATTORNEYS

INVENTORS
EDWIN A. BIERWIRTH
HERMAN J. KIENLE
BY
ATTORNEYS

May 23, 1939.   E. A. BIERWIRTH ET AL   2,159,880
METHOD OF MAKING A VEHICLE WHEEL
Filed Oct. 16, 1936   3 Sheets-Sheet 3
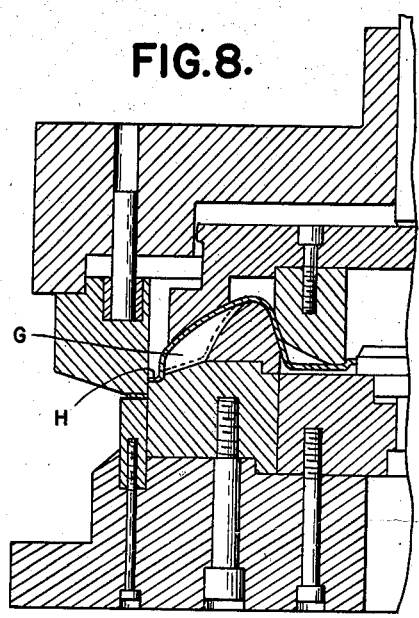
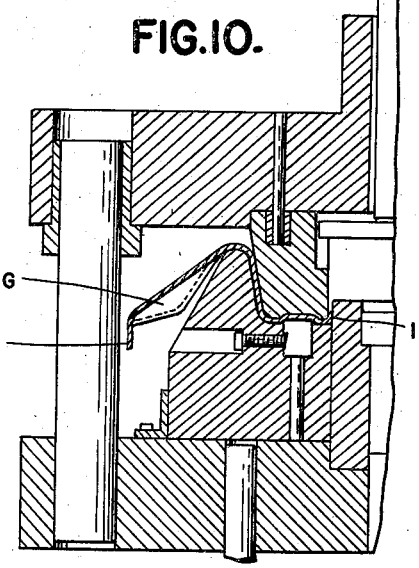
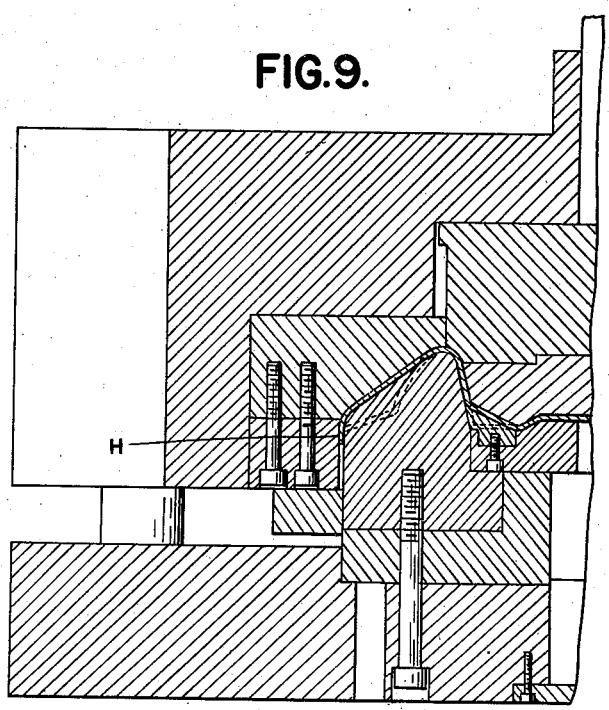
INVENTORS
EDWIN A. BIERWIRTH
HERMAN J. KIENLE
BY Whittemore Hulbert & Belknap,
ATTORNEYS Patented May 23, 1939

2,159,880

UNITED STATES PATENT OFFICE 2,159,880

METHOD OF MAKING A VEHICLE WHEEL

Edwin A. Bierwirth and Herman J. Kienle, Detroit, Mich., assignors to Kelsey-Hayes Wheel Company, Detroit, Mich., a corporation of Delaware Application October 16, 1936, Serial No. 106,024

1 Claim. (Cl. 29—159.03)

The invention relates to the manufacture of vehicle wheels of the general type which may be designated as dished disc wheels. It is the object of the invention to obtain a simple method of forming a wheel of this general type which nevertheless has something of the appearance of a spoked wheel. To this end the invention consists in the method as hereinafter set forth.

In the drawings:

Figures 4, 5, 6, 7, 8, 9 and 10 are similar views illustrating the successive steps in the forming operation.

Figures 1, 2:
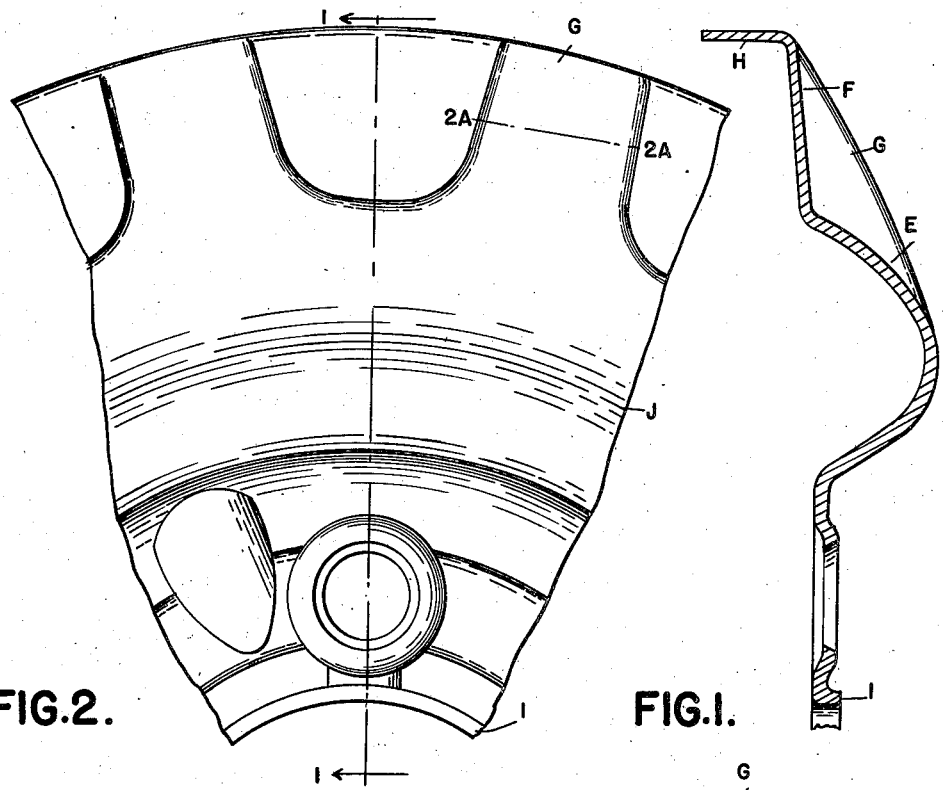
Figure 1 is a radial cross section through the dished disc as formed by my improved method.
Figure 2 is a front elevation of a segment of the structure.
Figure 2A:
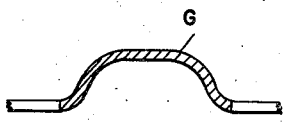
Figure 2A is a cross section on the line 2A—2A, Figure 2.
Figure 3:
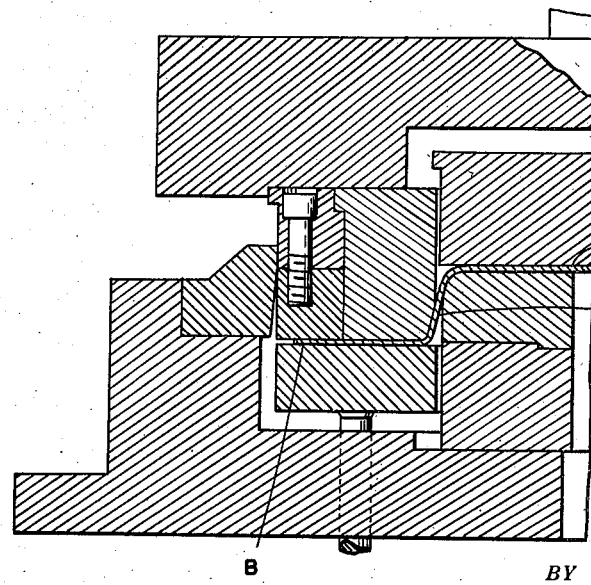
Figure 3 is a central section through the forming dies illustrating the first step of the forming operation.
Figure 4:
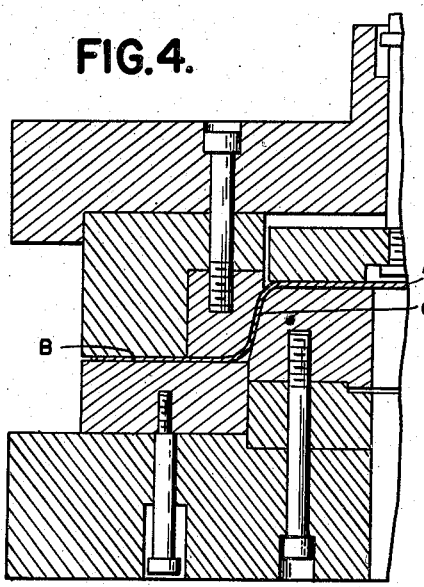
Figure 5:
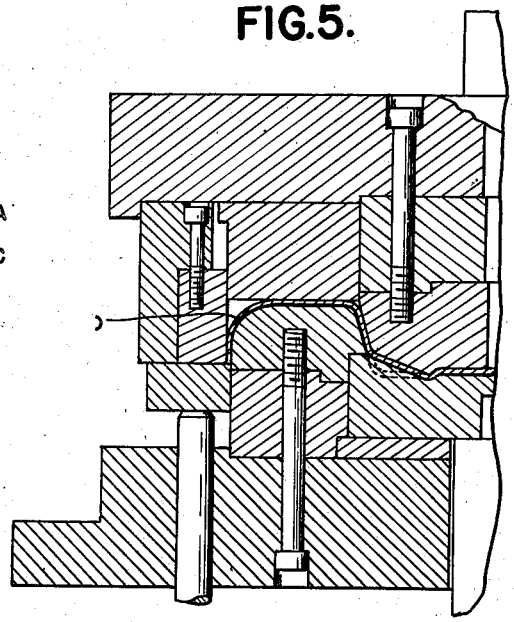
Figure 6:
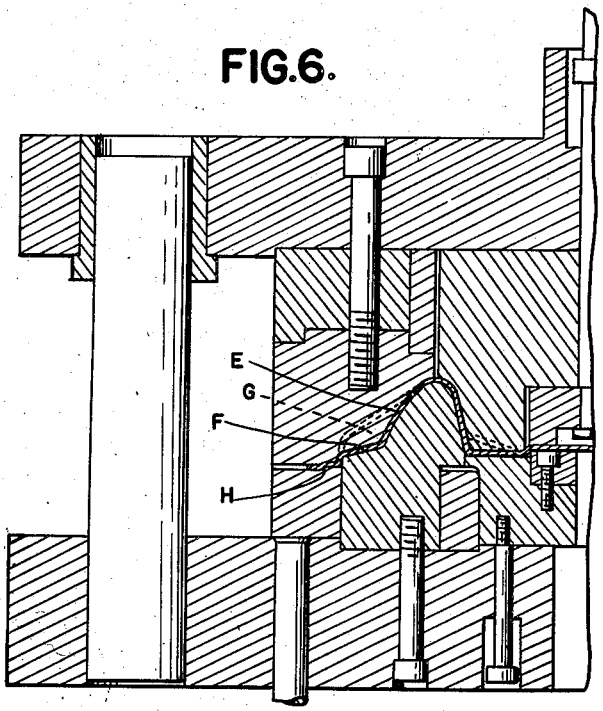

A circular blank of sheet metal is first drawn or cupped, as shown in Figure 3, to have a central portion A and peripheral flange portion B in spaced parallel planes connected by the intermediate portion C. In the next operation, Figure 4, the blank is repressed to more accurately form the portion C, following which it is reversed and the flange portion B is cupped or bowled in the opposite direction, as indicated at D, Figure 5. The portions B and D are next pressed, Figure 6, to form an obliquely extending portion E with a circular series of pockets F therein, and intermediate spoke sections G. There is also a radially outwardly extending flange H at the extreme periphery from which metal is drawn radially inward in the pressing of the pockets.

Figure 7:
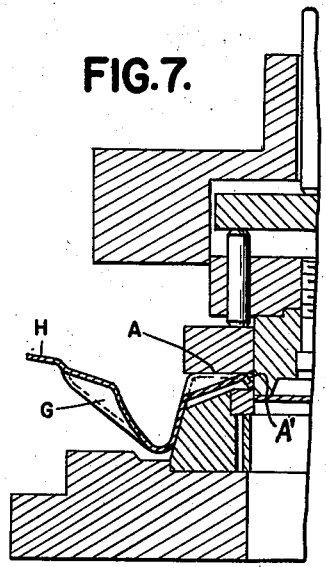

The next operation, Figure 7, is the piercing or cutting away of the center of the portion A to leave only an annular flange A'. The peripheral portion H is then trimmed, Fig. 8, to remove its scalloped or irregular edge, following which the remaining portion of the flange H is turned, Figure 9, to be parallel to the central axis. The inner edge portion of the flange A' is then turned to be parallel to the central axis, as indicated at I, Figure 10.

The resulting structure is a reversely dished disc continuous from center to periphery, but having the appearance of a spoked wheel. It is also provided with the continuous peripheral flange H which is riveted or otherwise secured to the rim of the wheel.

What we claim as our invention is:

In a method of forming pressed sheet metal wheel centers, the steps of dishing a circular sheet metal blank to form a central portion and peripheral portion in spaced parallel planes, reversely dishing the peripheral portion, re-pressing the reversely dished portion to form therein a circular series of spaced pockets with intermediate radially extending spoke portions and with a surrounding radially outwardly extending peripheral flange, the metal of said flange being to some extent drawn radially inward opposite said pocket portions to form an irregular or scalloped edge and the radial cross section of said flange resisting and limiting said movement, trimming said flange to remove the irregular or scalloped edge portion and turning said flange to be parallel to the central axis.

EDWIN A. BIERWIRTH.
HERMAN J. KIENLE.